2,774,794
Patented Dec. 18, 1956

2,774,794

PRODUCING A BIS (β-HALO) DISULFIDE

John M. Stewart, Missoula, Mont., assignor to Phillips Petroleum Company, a corporation of Delaware No Drawing. Application September 22, 1952, Serial No. 310,914

8 Claims. (Cl. 260—608)

This invention relates to the reaction in anhydrous media between selected halogens and selected olefin sulfides and to the products produced thereby. In one of its aspects this invention relates to a method for the production of bis (β-halo) disulfides.

In accordance with this invention I have found that when an olefin sulfide containing from 2 to 18 carbon atoms per molecule is reacted in an anhydrous system with a halogen selected from the group consisting of chlorine and bromine under reaction conditions more fully described hereinafter, a bis (β-halo) disulfide is produced as a product of the reaction. The compounds so produced are useful as components in high pressure lubricating agents. They are also useful as intermediates in the preparation of other chemical products. They have potential utility as additives for various polymeric materials as well as corrosion inhibitors for aqueous ammoniacal solutions.

It is an object of this invention to provide a process wherein olefin sulfides are reacted in anhydrous media with selected halogens.

It is an object of this invention to provide a process for the production of bis (β-halo) disulfides.

It is still another object of this invention to provide a process wherein selected olefin sulfides are reacted in anhydrous media with a halogen selected from the group consisting of chlorine and bromine to produce the corresponding bis (β-halo) disulfide.

A further object of this invention is to provide new chemical compounds belonging to the class of bis (β-halo) disulfides.

Other objects of this invention will be apparent from the accompanying disclosure and description.

The olefin sulfides employed in the present invention preferably contain from 2 to 18 carbon atoms per molecule, ethylene sulfide being the simplest member, and contain a sulfur atom attached to two directly connected carbon atoms, which may be represented structurally as follows:

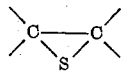

wherein the carbon atoms can be part of a ring or of an open chain of greater length. The dangling valences in the formula can be satisfied by radicals such as hydrocarbon, hydrogen, halogen, alkoxy, thioalkyl, carboxy, nitro and cyano. The hydrocarbon radical includes alkyl, cycloalkyl, aryl, alkaryl, aralkyl, alkenyl, cycloalkenyl, alkynyl and cycloalkynyl and each can be substituted by any of the above-mentioned groups, viz, halogen, alkoxy, thioalkyl, carboxy, nitro and cyano. It is preferred that no more than one of the dangling valences be satisfied by radicals other than hydrogen and hydrocarbon. A preferred class of olefin sulfides includes those in which the dangling valences in the above formula are satisfied by hydrogen, alkyl, cycloalkyl, aryl, alkaryl, and aralkyl radicals. As examples of olefin sulfides suitable for use in the process of the present invention, in addition to ethylene sulfide, the following may be mentioned: propylene sulfide, isobutylene sulfide, 1,2-butene sulfide, 2,3-butene sulfide, 3,4-hexene sulfide, 4,5-decene sulfide, 5,6-dodecene sulfide, 3,4-hexadecene sulfide, 9,10-octadecene sulfide, and higher alkene sulfides; cyclic olefin sulfides such as cyclopentene sulfide, cyclohexene sulfide and the like; and substituted olefin sulfides, as for example, phenylethylene sulfide, tolylethylene sulfide, cyclohexylethylene sulfide, phenylpropylene sulfide, chloropropylene sulfide, 3-cyano-1,2-propene sulfide, 2 chloro-2,3-decene sulfide, 5-ethyl-3,4-octene sulfide, 5-chloro-2,3-octene sulfide, 2-methyl-5-phenyl-2,3-pentene sulfide, 1-chlorophenyl-2,3-butene sulfide, 2,3-dimethyl-2,3-hexene sulfide, 1-chloro-3,4-cyclohexene sulfide, 1,4-diethyl-2,3-cyclohexene sulfide, 1-(β-chloroethyl)2,3-cyclohexene sulfide, 2-bromo-5-ethyl-5,6-nonene sulfide, 2-bromo-3,4-nonene sulfide, 3-ethoxy-5,6-octene sulfide, 6-thioethyl-2,3-dodecene sulfide, 4-carboxy-6,7-decene sulfide, 3-nitro-4,5-octene sulfide, and the like.

As mentioned earlier herein, the halogen employed in the process of this invention is one selected from the group consisting of chlorine and bromine.

The reaction can be carried out in the presence of an inert gas such as air or nitrogen but is preferably carried out in a non-reactive solvent such as carbon tetrachloride, carbon disulfide, chloroform, benzene, pentane, halogenated hydrocarbons, dioxan and the like.

The reaction between chlorine or bromine and the olefin sulfide proceeds, in the absence of water, according to the following proposed equation:

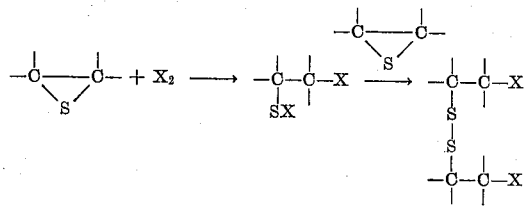

wherein X is the selected halogen and each dangling valence is satisfied as hereinbefore described. In some experiments where the manner of addition of the reactants was reversed, that is propylene sulfide was added dropwise to a molar equivalent of liquid chlorine or bromine, the 1-halo-2-propanesulfenyl halides were obtained, although mixed with sulfenyl halides containing larger amounts of halogen. In one case, 1-chloro-2-propanesulfenyl chloride was obtained in a fairly pure state and on reaction with propylene sulfide gave bis(1-methyl-2-chloroethyl) disulfide. It should be noted that the addition of halogen is always in the position beta to the functional sulfur-containing group. Further, the halogen will add to that beta carbon atom in the olefin sulfide which is lowest in degree. That is, if the two carbon atoms to which the sulfur is linked in the olefin sulfide vary in degree, viz, one is a secondary carbon atom and the other a primary carbon atom, as for example, propylene sulfide, the halogen will add to the primary carbon atom.

Those skilled in the art will appreciate that if aliphatic unsaturation exists in the olefin sulfide, the unsaturated bond will be subject to attack by the halogen. However, this will not affect the direction of the primary reaction.

The reaction is preferably carried out in a non-reactive anhydrous solvent present in an amount ranging from 1 to 20 parts by weight of the olefin sulfide employed. The halogen is slowly added to the cooled agitated mixture of solvent and olefin sulfide and the mixture agitated until the reaction is complete, generally over a period of from 15 minutes to 10 hours. The temperature of the reaction mixture is preferably maintained in the range of minus 20 to plus 30° C. but high enough to keep the solvent employed in the liquid phase. Temperatures outside this range can be used if desired. While the pressure may be varied, ordinary atmospheric pressure is conveniently used in carrying out the reaction. However, if chlorine is employed care should be taken to avoid extreme pressures thereby minimizing the possibility of undesirable side reactions. If chlorine is the halogen employed it can be bubbled through the mixture. Bromine can be added either in the pure state or as a solution the solvent of which is preferably the same as that employed as medium for the reaction. The endpoint of the reaction can in most instances be determined by the persistence of a yellow color to the reaction mixture. The reaction is quantitative in nature, two gram moles of olefin sulfide reacting with one gram mol of halogen.

The product of the reaction is recovered from the reaction mixture by removing any excess halogen in a conventional way, such as by washing with sodium bisulfite solution and drying over a conventional desiccant like anhydrous calcium chloride. The solvent, if employed, can be removed by vacuum distillation. If desired the product can be purified by redistillation or crystallization and recrystallization.

In a specific embodiment, the method of this invention comprises cooling a solution of olefin sulfide in carbon tetrachloride to 0° C., and slowly adding halogen with agitation until a yellow color persists, generally over a period of one hour. At the end of the reaction period the excess halogen is removed, the solution dried, solvent removed by vacuum distillation and the product purified by distillation or crystallization. This general procedure was used in carrying out the following specific examples which illustrate particular embodiments of the invention. The examples are not to be construed as limiting the invention unduly but merely as illustrative of the principles underlying the invention.

*Example I*

A solution of 8.535 grams of propylene sulfide (0.115 mol) in 25 ml. of carbon tetrachloride was chilled externally by an ice bath. A solution containing 9.48 grams of bromine in 50 ml. of CCl4 was added dropwise with continual stirring until a persistent yellow color was obtained. The 0.115 mol of propylene sulfide absorbed 9.1 grams or 0.057 mol of Br2. The solution was then washed twice with 5 percent sodium carbonate solution and dried over anhydrous calcium chloride. The CCl4 was removed under vacuum at room temperature and distillation and redistillation gave 15.6 grams of a colorless liquid, B. P. 114–117° C. at 1 mm. pressure and a refractive index at 20° C. of 1.5838. The formula was proved to be $$\begin{array}{c} CH_3-CH-CH_2Br \\ | \\ S \\ | \\ S \\ | \\ CH_3-CH-CH_2Br \end{array}$$

and not the isomeric compound with the sulfur-containing group on the primary carbon atom by treating a portion of the product with piperidine to produce

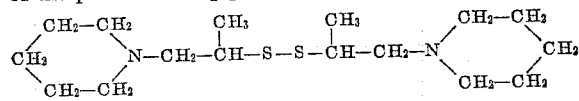

and then treating the resultant product with Raney nickel. By its characteristics the product of this last reaction was shown to be N-n-propylpiperidine and not N-isopropylpiperidine which proved the structure of the first compound to be as shown.

*Example II*

5 ml. (8 grams, 0.113 mol) of chlorine was collected in a dry-ice cooled tube and then allowed to vaporize into a stirred and cooled solution of 16.7 grams (0.226 mol) of propylene sulfide in 120 ml. of chloroform. When the reaction was nearly complete the solution became a permanent light yellow color. The chloroform was removed under vacuum. Though part of the product was lost here by foaming over with the solvent, a yield of 19.5 grams of crude product was obtained. On distillation there was obtained a colorless oil boiling from 98 to 101° C. at about 1 mm. pressure and having a refractive index at 20° C. of 1.5400. The formula was proved to be $$\begin{array}{c} CH_3-CH-CH_2Cl \\ | \\ S \\ | \\ S \\ | \\ CH_3-CH-CH_2Cl \end{array}$$

and not the isomer with the sulfur-containing group on the primary carbon by the method hereinbefore described.

*Example III*

Chloropropylene sulfide was reacted with chlorine as in Example II. A yellowish oil product was obtained boiling in the range 160 to 163° C. at 1 mm. pressure. This crystallized on chilling to a white solid which on recrystallization from ethanol melted at 67 to 69° C. The formula is believed to be $$\begin{array}{c} ClCH_2-CH-CH_2Cl \\ | \\ S \\ | \\ S \\ | \\ ClCH_2-CH-CH_2Cl \end{array}$$

*Example IV*

Liquid chlorine, 5.0 g. (0.07 mol), and 10 ml. of chloroform were mixed and cooled in a Dry Ice-acetone bath while 5.7 g. of propylene sulfide (0.077 mol) in 40 ml. of chloroform (precooled in a Dry-Ice bath) was added over a period of 10 minutes. Argon was then bubbled through the mixture to remove any unreacted chlorine and the solvent was stripped at room temperature. On distillation of the crude product it was apparent from the lack of definite boiling point that a mixture was present. However, 3.6 ml. of orange liquid boiling from 40–50° (4.5 mm.) was redistilled to yield 2 g. (20 percent) of orange liquid; B. P. 44–47° (6 mm.); $n_D^{19}$ 1.5200. The higher boiling liquid products were apparently more highly chlorinated.

The product 1-chloro-2-propanesulfenyl chloride, was not directly analyzed but was treated at once with propylene sulfide and thus converted to the previously prepared bis-(1-methyl-2-chloroethyl) disulfide. The reaction was rapid and the solution of product was colorless. Distillation yielded a colorless oil; B. P. 96–98° (1 mm.); $n_D^{19}$ 1.5420. These constants compare closely to those of bis-(1-methyl-2-chloroethyl) disulfide obtained by addition of chlorine to propylene sulfide.

While the invention has been described and exemplified in terms of preferred embodiments those skilled in the art will readily appreciate that modifications can be made without departing from the spirit and scope of the invention.

I claim:

1. The method of producing a bis (β-halo) disulfide which comprises reacting, in the absence of water, a halogen selected from the group consisting of chlorine and bromine with an olefin sulfide containing the structure

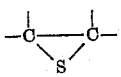

and containing from 2 to 18 carbon atoms the amounts of halogen and olefin sulfide present being sufficient to produce said bis (β-halo) disulfide.

2. The method which comprises reacting in an anhydrous solvent a halogen selected from the group consisting of chlorine and bromine with an olefin sulfide containing the structure

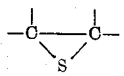

and containing from 2 to 18 carbon atoms per molecule in a molecular ratio of about 1:2 to produce a bis (β-halo) disulfide.

3. A process for producing a bis (β-halo) disulfide from an olefin sulfide containing the structure

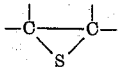

and containing from 2 to 18 carbon atoms per molecule and a halogen selected from the group consisting of chlorine and bromine which comprises admixing one molecular equivalent of said halogen with two molecular equivalents of said olefin sulfide dissolved in from 1 to 20 parts by weight of a liquid anhydrous solvent with continuous agitation at a temperature in the range of minus 20 to plus 30° C. at about atmospheric pressure, agitating the reaction mixture over a period of 15 minutes to 10 hours, and recovering therefrom a bis (β-halo) disulfide as a product.

4. A process according to claim 3 wherein chlorine is admixed with a solution of propylene sulfide in carbon tetrachloride and bis (1-methyl-2-chloroethyl) disulfide is recovered as a product.

5. A process according to claim 3 wherein bromine is admixed with a solution of propylene sulfide in carbon tetrachloride and bis (1-methyl-2-bromo-ethyl) disulfide is recovered as a product.

6. A process according to claim 3 wherein chlorine is admixed with a solution of cyclohexene sulfide in an anhydrous solvent and bis (2-chloro-1-cyclo-hexyl) disulfide is recovered as a product.

7. A process according to claim 3 wherein chlorine is admixed with a solution of chloropropylene sulfide in chloroform and bis (1-chloromethyl-2-chloroethyl) disulfide is recovered as a product.

8. A process according to claim 3 wherein chlorine is admixed with a solution of ethylene sulfide in an anhydrous solvent and bis (2-chloro-ethyl) disulfide is recovered as a product.

References Cited in the file of this patent

UNITED STATES PATENTS

| | | |
|---|---|---|
| 2,467,713 | Watkins | Apr. 19, 1944 |
| 2,510,893 | Kleiman | June 6, 1950 |

OTHER REFERENCES

Allott: Richter's Organic Chemistry, third ed., Amer. Photo Offset Reprint, vol. 1, page 172. Published by Elsevier Publishing Co., distrib. by Nordeman Pub. Co., New York, N. Y., 1944.

Meade et al.: Jour. Chem. Soc. (London), 1948, page 1894.

Hackmann: Chem. Abstracts 44:232h (1950).

Stewart: Chem. Abstracts 45:2852g (1951).

Pope et al.: J. Chem. Soc. 121, 1166–70.